(12) United States Patent
Wilson, III

(10) Patent No.: US 6,620,871 B2
(45) Date of Patent: Sep. 16, 2003

(54) RUBBER COMPOSITIONS WITH INCREASED SHELF LIFE AND REDUCED CURE TEMPERATURES AND TIMES

(75) Inventor: Thomas Woodrow Wilson, III, Taichung (TW)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 09/876,652

(22) Filed: Jun. 7, 2001

(65) Prior Publication Data

US 2003/0013793 A1 Jan. 16, 2003

(51) Int. Cl.$^7$ .............................. C08K 5/05; C08K 3/06; C08K 5/36; C08K 3/36; C08L 91/06
(52) U.S. Cl. ..................... 524/398; 524/289; 524/392; 524/418; 524/487
(58) Field of Search ................................ 524/398, 487, 524/392, 289, 418

(56) References Cited

U.S. PATENT DOCUMENTS

| | | | |
|---|---|---|---|
| 3,923,731 A | * 12/1975 | MacKenzie, Jr. | 524/176 |
| 4,020,214 A | * 4/1977 | MacKenzie, Jr. | 428/389 |
| 4,172,189 A | * 10/1979 | Muller et al. | 524/315 |
| 4,214,058 A | 7/1980 | Imamura et al. | 525/348 |
| 4,302,361 A | * 11/1981 | Kotani et al. | 252/503 |
| 4,742,103 A | * 5/1988 | Morita et al. | 524/174 |
| 4,818,325 A | * 4/1989 | Hiraiwa et al. | 156/315 |
| 4,948,826 A | * 8/1990 | Hirai | 524/306 |
| 5,292,364 A | * 3/1994 | Hiraiwa et al. | 106/287.1 |
| 5,352,724 A | * 10/1994 | Fujiki et al. | 524/398 |
| 5,354,618 A | * 10/1994 | Ishigaki et al. | 428/424.8 |
| 5,587,110 A | * 12/1996 | Yamana et al. | 252/502 |
| 5,591,797 A | * 1/1997 | Barthel et al. | 106/482 |
| 5,677,411 A | * 10/1997 | Ward et al. | 524/265 |
| 5,932,661 A | 8/1999 | Simonutti | 525/274 |
| 6,048,943 A | 4/2000 | Blok et al. | 525/331.8 |
| 6,090,880 A | * 7/2000 | Zimmer et al. | 524/492 |
| 6,124,370 A | 9/2000 | Walton et al. | 521/143 |
| 6,150,453 A | 11/2000 | Mahmud et al. | 524/492 |
| 6,342,560 B1 | * 1/2002 | Okel | 106/468 |

FOREIGN PATENT DOCUMENTS

| | | | | |
|---|---|---|---|---|
| EP | 0 544 318 | * | 6/1993 | 524/398 |
| JP | 64-16868 | * | 1/1989 | 524/398 |

OTHER PUBLICATIONS

DuPont Performance Chemicals, Technical Information, TYZOR Organic Titanates, Oct. 1, 1998 (11 pages).

DuPont Performance Chemicals, Technical Information, TYZOR AA, Titanium Acetylacetonates, Feb. 28, 1998 (5 pages).

Salvatore J. Monte, Applications of Titanate and Zirconate Coupling Agents in Thermoplastics and Thermoset Elastomers—2001, Kenrich Petrochemicals, Inc., Presented at a meeting of the Rubber Division, American Chemical Society, Providence Rhode Island, Apr. 24–27, 2001, Paper No. 16, pp. 2–84.

DuPont Performance Chemicals, Technical Information, TYZOR, Organic Titanates and Zirconates; TYZOR Organic Titanates as Crosslinking Agents, Feb. 28, 1998 (4 pages).

ww.golfballx.com; web page, printed Feb. 28, 2001.

* cited by examiner

*Primary Examiner*—Peter Szekely
(74) *Attorney, Agent, or Firm*—Harness, Dickey & Pierce, PLC

(57) ABSTRACT

Rubber compositions contain, in addition to synthetic or natural rubber and conventional curing agents, an auxiliary composition containing a titanium or zirconium compound. The compositions are characterized by an enhanced cure rate at elevated temperatures such as would be useful for producing molded articles. At the same time the compositions exhibit an increased shelf life whereby uncured compositions of the invention are stable and can be molded for a considerable period of time even after storage at room temperature. Titanium compounds of the invention have at least one alkoxy group bonded to titanium, and zirconium compounds of the invention have at least one alkoxy group bonded to zirconium. In preferred embodiments, the auxiliary composition contains chelates of the titanium or zirconium compound. In particular, the auxiliary composition enhances the rate of cure at elevated temperature, and retards curing at room temperature.

61 Claims, 11 Drawing Sheets

RUBBER COMPOSITIONS WITH INCREASED SHELF LIFE AND REDUCED CURE TEMPERATURES AND TIMES

FIELD OF THE INVENTION

The invention relates to rubber compositions with increased shelf life and reduced cure temperatures and times. More particularly, it relates to the use of titanium and zirconium compounds to produce rubber compositions that remain moldable for a long period of time in an uncured state, but that quickly cure on application of heat.

BACKGROUND OF THE INVENTION

Synthetic and natural rubbers have a variety of unique and useful physical properties. In an uncured or natural state, such materials generally exhibit properties that are less than optimal for everyday or industrial use. Accordingly, rubber compositions are generally reacted with crosslinkers such as those containing sulfur or peroxide in order to cure the rubber to produce industrial articles having acceptable properties. In general, heat is applied to a rubber composition during a molding operation to produce molded articles having desired physical properties.

For many reasons, it is often desirable to increase the rate of cure in such molding operations. If the cure rate can be increased, articles can be molded for shorter times or they can be molded for the same time at lower temperatures. In either instance, a process is generally cheaper if the rate of cure is faster. Over the years, a variety of additives has been developed that can be added to rubber compositions to generally increase the cure rate. Examples of such additives include the well-known sulfenamide accelerators. Using the known accelerators, rubber compositions can be formulated having a wide range of cure rates. In general, it would be desirable to provide rubber compositions having even greater cure rates so as to achieve the benefits noted above.

Natural and synthetic rubber in an uncured state is subject to deterioration by oxidation because of the reactive double bonds in the molecule. U.S. Pat. No. 4,214,058 to Imamura et al. discloses the use of a narrow class of titanium organic complexes to reduce the susceptibility of such unvulcanized rubber to oxidative deterioration during storage. In addition to oxidative deterioration during storage, rubber compositions are subject to a number of other processes during storage that tend to reduce the useable life of the uncured composition. Thus, rubber compositions containing both curing agents and the usual accelerators have a limited shelf life because of a finite rate of cure even at room temperature. It has been generally observed that a formulated rubber composition containing curing agents can be reliably molded into useful articles for only a few days after compounding even if it is stored at room temperature. The useful "shelf life" might be extended by refrigerating the uncured rubber compositions, but this would generally result in too much added expense. It is believed that the short shelf life of the uncured rubber compositions is due to the fact that curing, which is a chemical reaction, takes place at a finite rate even at room temperature. In fact, the accelerators used to increase the cure rate at the higher temperatures typical of the molding operation also tend to increase the cure rate at room temperature. For this reason, the uncured rubber compositions gradually cure at lower temperatures until they can no longer be molded successfully. Compounding the problem is the general observation that rubber articles cured at low temperatures such as room temperature and even up to about 120° F. or slightly above tend to have less than desirable physical properties. As a consequence, rubber compositions that have been in storage at room temperature for a number of days become useless for producing industrial articles.

As a consequence, rubber compositions must as a rule be molded into a finished article within a few days of formulation. This is a disadvantage when for logistical or other reasons it would be desirable to formulate a rubber composition and hold it for a period of time before molding. For example, it may be desirable to compound a composition in a central location and carry out molding at a number of satellite sites distant from the central site. Such may be the situation for example, when a number of manufacturing sites are located far from one another, perhaps even in different countries. It would then be desirable to save the capital expense of providing each molding facility with expensive compounding and storage facilities. In such a situation, it would be advantageous to compound the composition centrally and ship it to remote sites in a just-in-time fashion for molding. In such a situation, quality control of the manufactured articles would also be simplified because all compounding could take place in one or only a few locations.

As noted above, additives of the prior art that increase the rate of cure under molding conditions also tend to decrease the shelf life by also increasing the rate of cure at room temperature. It would thus be desirable to provide rubber compositions that have desirably fast cure times at higher temperatures, but which nevertheless maintain a shelf life at lower temperatures such as room temperature. Preferably, such compositions would provide for increased rates at temperatures in the range of 100° C. 200° C., but which slow down the rate of self cure upon standing at room temperature.

It has been surprisingly found that a group of titanium and zirconium compounds with specially defined structures are useful for preparing rubber compositions with such cure properties. Although similar compounds have been used in rubber compositions of the prior art, the specific structures of the invention have not been shown to provide rubber compositions with enhanced cure rates at elevated temperatures, improved cure rates at temperatures lower than typically employed, and increased shelf life at room temperature.

SUMMARY OF THE INVENTION

Rubber compositions contain, in addition to synthetic or natural rubber and conventional curing agents, an auxiliary composition containing a titanium or zirconium compound. The compositions are characterized by an enhanced cure rate at elevated temperatures such as would be useful for producing molded articles. At the same time the compositions exhibit an increased shelf life whereby uncured compositions of the invention are stable and can be molded for a considerable period of time even after storage at room temperature. Titanium compounds of the invention have at least one alkoxy group bonded to titanium, and zirconium compounds of the invention have at least one alkoxy group bonded to zirconium. In preferred embodiments, the auxiliary composition contains chelates of the titanium or zirconium compound. The auxiliary composition works to provide the rubber compositions of the invention with curing behavior which was not to be expected from conventional accelerators of the prior art. In particular, the auxiliary composition enhances the rate of cure at elevated temperature, and retards curing at room temperature.

DETAILED DESCRIPTION OF THE PREFERRED EMBODIMENTS

Figure 1:
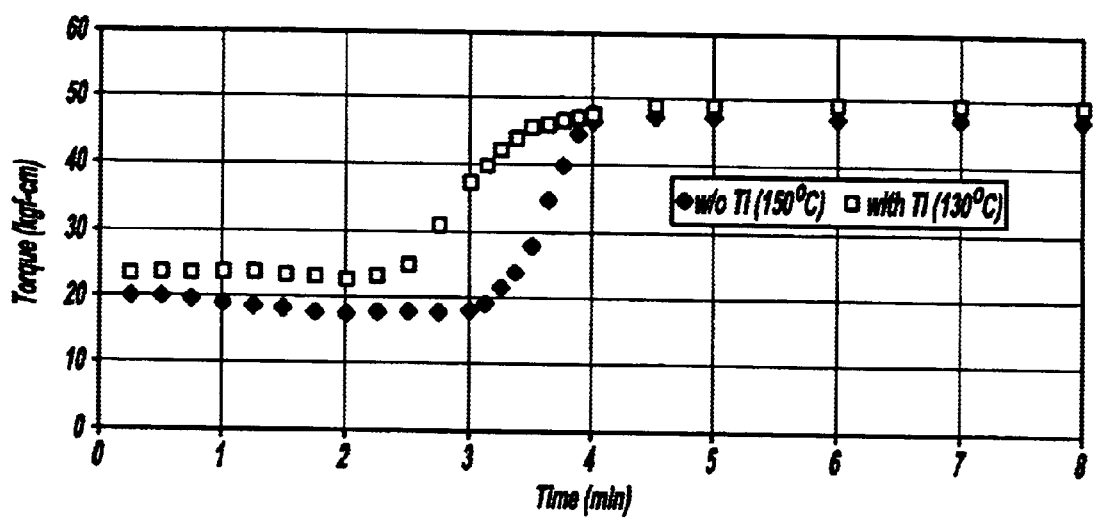
FIG. 1 shows rheometer cure curves of formulas with and without the auxiliary composition of the invention.

The present invention provides an improvement to rubber formulations that reduces the cure temperature while still allowing the rubber to cure in a reasonable time. In particular, additives have been discovered that, when added to rubber compositions containing rubber and curing agents, increase the rate of cure at elevated temperatures of 90° C. up to about 200° C., yet actually seem to reduce the cure rate of the compositions at room temperature or below about 30° C. Alternatively, the additives of the invention may be added to rubber compositions to lower the temperature of cure in the range of about 90–200° C. As a result, many processing and manufacturing advantages result, as will be discussed below. A particular advantage of the compositions of the invention is that they exhibit a long "shelf life" in the uncured state, as will be elaborated below. Surprisingly, the compositions of the invention can be stored in an uncured state for a week, two weeks, and longer, without losing their ability to be molded into useful industrial articles. The compositions seem to be much less prone to self-cure when held at ambient temperatures such as 30–40° C. or less. The favorable curing characteristics of the improved rubber formulations are suitable for use in production environments and are also useful where rapid prototyping is required. The rubber compositions of the invention may be molded in fusible alloy molds or in conventional molds such as of steel or aluminum. Fusible alloy molds have melting points below the normal cure temperature for many conventional rubber compositions and articles; i.e. fusible alloys which melt below 140° C. The compositions may be used to prepare a wide variety of rubber articles. Non-limiting examples of such articles include hoses, belts, gaskets, specialized vibration damping fixtures and industrial products, condoms, gloves, catheters, and other medical devices, and commodity items such as tires. In a preferred embodiment, the rubber compositions of the invention are used to make rubber shoe outsoles.

The rubber compositions of the invention contain natural or synthetic rubber, or mixtures of rubbers, as well as conventional rubber additives such as curing agents and accelerators. In addition, the compositions of the invention contain one or more additives selected from a special class of organic titanium or zirconium compounds. Surprisingly, it has been found that these compounds permit the use of lower cure temperatures at comparable times while still maintaining acceptable properties in the cured rubber. Alternatively, the compositions of the invention may be used to provide rubber articles that are cured at elevated temperatures for shorter times to produce a good quality product.

In general, any rubber that can be crosslinked by a sulfur cure may be used to make the compositions of the invention. Sulfur cured describes the vulcanization process typical of making rubber. Mixtures of rubbers may also be used. Examples of rubbers useful in the invention include, without limitation, natural rubber such as those based on polyisoprene.

Synthetic rubbers may also be used in the invention. Examples include, without limitation, synthetic polyisoprenes, polybutadienes, acrylonitrile butadiene rubber, styrene acrylonitrile butadiene rubber, polychloroprene rubber, styrene-butadiene copolymer rubber, isoprene-isobutyilene copolymer rubber and its halogenated derivatives, ethylene-propylene-diene copolymer rubbers such as ethylene-propylene-cyclopentadiene terpolymer, ethylene-propylene-5-ethylidene-norbornene terpolymer, and ethylene-propylene-1,4-hexadiene terpolymer, butadiene-propylene copolymer rubber, butadiene-ethylene copolymer rubber, butadiene-isoprene copolymer, polypentenamer and their mixtures. In general, such compounds are characterized by repeating olefinic unsaturatation in the backbone of the polymer, which generally arises from the presence of butadiene or isoprene monomers in the polymer structure.

Conventional sulfur based curing agents may be used in the compositions of the invention. Such curing agents are well known in the art and include elemental sulfur as well as a variety of organic sulfide, disulfide and polysulfide compounds. Examples include, without limitation, vulcanizing agents such as morpholine disulfide, 2-(4'-morpholinodithio)benzothiazole, and thiuram compounds such as tetramethylthiuram disulfide, tetraethylthiuram disulfide and dipentamethylenethiuram tetrasulfide. The vulcanizing agents may be used alone or in combination with each other. In a preferred embodiment, sulfur is used as the curing agent.

The rubber compositions of the invention also in general, contain conventional accelerators. Such accelerators and co-accelerators are known in the art and include without limitation, those based on dithiocarbamate, thiazole, amines, guanidines, xanthates, thioureas, thiurams, dithiophosphates, and sulfenamides. Non-limiting examples of accelerators include: zinc diisobutyldithiocarbamate, zinc salt of 2-mercaptobenzothiazole, hexamethylenetetramine, 1,3-diphenyl guanidine, zinc isopropyl xanthate, trimethyl thiourea, tetrabenzyl thiuram disulfide, zinc-O-,O-di-n-butylphosphorodithiolate, and N-t-butyl-2-benzothiazylsulfenamide.

The rubber compositions of the invention can be compounded in conventional rubber processing equipment. In a typical procedure, all components of the rubber composition are weighed out. The rubber and additives are then compounded in a conventional mixer such as a Banbury mixer. If desired, the compounded rubber may then be further mixed on a roller mill. At this time, it is possible to add pigments such as carbon black. The composition may be allowed to mature for a period of hours prior to the addition of sulfur and accelerators, or they may be added immediately on the roller mill. It has been found to be advantageous to add the accelerators into the Banbury mixer in the later stages of the mixing cycle. Adding the accelerators into the Banbury mixer generally improves their distribution in the rubber composition, and aids in the reduction of the cure time and temperatures that is observed in the compositions of the invention. In general, the elemental sulfur curing compound is not added into the Banbury mixer. Organic sulfides (sulfur donating compounds) may be added to the Banbury mixer.

The rubber compositions of the invention contain at least one of a class of titanium or zirconium compounds. The zirconium or titanium compounds of the invention can be characterized as those which contain a alkoxy group —OR bonded respectively to titanium or zirconium. Mixtures of the zirconium and titanium compounds of the invention may also be used. Generally, the R group of the alkoxy group is an alkyl group having 8 or fewer carbon atoms. In a preferred embodiment, the R group contains 6 or fewer carbons, and more preferably contains 4 or fewer carbon atoms. Examples of alkyl groups containing 4 or fewer carbon atoms include methyl, ethyl, n-propyl, isopropyl, n-butyl, isobutyl, sec-butyl, and t-butyl.

In a preferred embodiment, the titanium or zirconium compound has 2 alkoxy groups bonded to the titanium or zirconium. In another preferred embodiment, there are 4 alkoxy groups —OR bonded to the central titanium or zirconium atom where R is as described above. Based on the above, there are several forms of the titanium and zirconium compounds. Preferred compounds include the tetralkyl (those having four alkoxy groups bonded to the metal) and the chelate forms. A class of compounds that has shown good utility in the present invention is the chelates. Chelates in general, are those titanium or zirconium compounds that are complexed with an organic ligand system that contains two atoms or functional groups capable of forming covalent or dative bonds to the central titanium or zirconium compound. Generally, the atoms or functional groups which form covalent or dative bonds to the central atom are those that are highly electronegative and include oxygen, nitrogen, and sulfur. The two atoms or functional groups providing the ligand to the central titanium and zirconium atoms may be the same or different. In a preferred embodiment, the atoms bonded to the central titanium or zirconium atom through the chelate are oxygen. Examples of chelating ligands include, without limitation, acetylacetonate, ethyl acetylacetonate, triethanolamine, lactic acid and its salts such as the ammonium salt, glycolic acid and its salts, and esters of citric acid, such as diethyl citrate. A well known chelate useful in the invention is the titanium acetylacetonate chelate compound illustrated by the following formula.

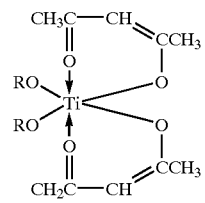

where R comprises an alkyl group of 8 carbons or less, preferably 6 carbons or less, and more preferably 4 carbons or less. Here the chelate contains two alkoxy groups OR and a central titanium atom on which two acetylacetone groups are chelated. It can be seen that the titanium atom, the two dative bonding groups on the chelate molecule, and the atoms bridging the two dative bonding groups form a six membered ring. In general, chelates of the invention include those which form from a five to an eight membered ring with the titanium atom and the two dative bonding groups of the chelating ligand. In the figure, the R groups are as described above. In a preferred embodiment, the R groups in the figure are isopropyl. Other chelates may be used in the rubber compositions of the invention. The above figure is provided for illustration only. In other preferred embodiments, other chelating ligands such as triethanolamine, lactic acid ammonium salt, diethyl citrate, and ethyl acetylacetone are used. It is also possible to substitute zirconium for titanium in the structure illustrated above.

The zirconium or titanium chelates are generally highly colored, ranging from yellow to a dark red. This generally provides no problems if the chelate compounds are to be formulated into black rubber compositions. On the other hand, if white or lightly colored rubber compositions are to be formulated, then tetralkyl and polymeric forms of the titanium and zirconium compounds are preferred, as they are not as deeply colored.

The compositions of the invention contain an effective amount of the titanium or zirconium compound. Generally, the compositions will have from about 0.01 parts to about 10 parts per hundred parts of rubber resin (phr) of the titanium or zirconium compound. Depending on the variety of rubber, and additives such as accelerators and fillers, formulations have been compounded at amounts ranging from about 0.1 to about 5 phr by weight of the titanium or zirconium compound. Generally, the compounds are available in as supplied form from about 70% to greater than 98% active.

In a preferred embodiment, the titanium or zirconium compounds have four alkoxy groups. For a titanium compound, the general structure can be represented by the formula

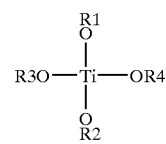

where the structure depicted is a tetralkyl titanate. For a zirconium compound, the formula is the same except that zirconium is substituted for titanium as the central atom. The organic side chains can be represented by R1, R2, R3, and R4. In general, R1, R2, R3, and R4 can be the same or different. When the R groups are identical it is common to depict the tetralkyl titanate by the general formula $Ti(OR)_4$. An example of a tetralkyl titanate where all the R groups are identical is tetra n-butyl titanate. In the formula, the titanium has 4 alkoxy groups OR wherein R is an alkyl group of 8 carbons or less. Preferably R is an alkyl group of 6 carbons or less. In a preferred embodiment, the alkyl groups are of 4 carbons or less as discussed above for the chelates. It appears that the length of the pendant organic group determines the effectiveness of the titanium or zirconium compound to reduce the cure temperature of rubber compositions or the invention. Without being bound by theory, it is believed that the lower molecular weight side chains such as those containing 8 carbons or less and preferably 6 carbons or less and more preferably 4 carbons or less, will cause the titanium or zirconium compound to break down at relatively lower temperatures and hence produce their catalytic effect. As the molecular weight of the pendant organic groups increases, the compound in generally becomes more thermally stable and is less capable of having a catalytic effect on cure.

Another sub-class of titanium or zirconium compounds useful in the invention is the polymeric titanates or zirconates. The titanates can be represented by the general structure

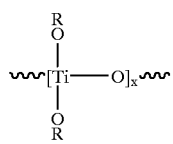

where x represents the degree of polymerization. The zirconates are like the titanates, with zirconium substituted for titanium. Such polymeric titanate materials can be made by condensing a tetraalkyl titanate, as described for example in U.S. Pat. No. 2,621,193. The analogous polymeric zirconates can be synthesized by the procedure outlined for the polymeric titanates. The R group in the alkoxy group —OR in the formula above is defined as for the chelates and for the tetralkyl titanates.

Titanium and zirconium compounds of the invention are commercially available for example from DuPont under the Tyzor® trade name. One example is Tyzor AA-75, which is a 75% solution in isopropanol of the titanium diisopropyl acetylacetonate given in Table 1. Another is Tyzor® BTP, which is poly n-butyl titanate. Example RPT-43 below shows the effect of Tyzor® BTP at an additive amount of 3 phr. Using the polymeric titanate, a rubber composition was formulated that had a time T90 for cure of less than 5 minutes at 125° C.

Figure 11:
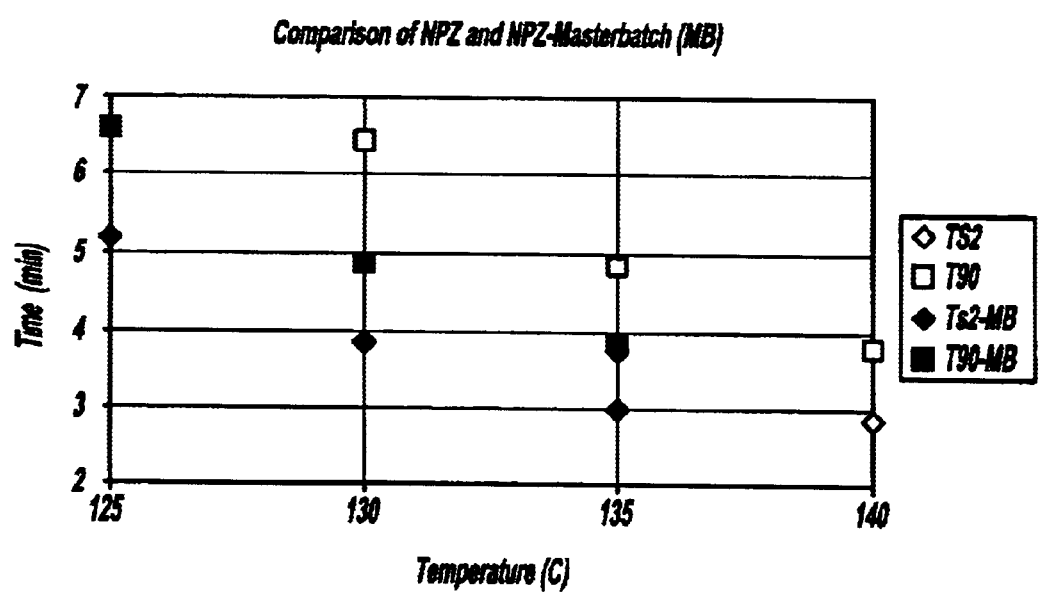
FIG. 11 is a comparison of the cure time for two rubber compositions containing a zirconium compound.

It may be desirable to protect the titanium and/or zirconium compounds from hydrolysis during use. In general, it is observed that the tetralkyl zirconates and titanates tend to have a higher rate of hydrolysis than the chelate compounds. The susceptibility to hydrolysis increases as the size of the R group on the alkoxy group —OR decreases. The zirconium compounds tend to be more sensitive than the titanium compounds to moisture. When susceptibility to hydrolysis of the compounds of the invention is a concern, it has been found useful to provide the zirconium or titanium compounds of the invention as auxiliary compositions in the form of masterbatches. To make the masterbatches, the zirconium or titanium compound is admixed with a hydrophobic material that protects it from moisture. In a preferred embodiment, the hydrophobic compound comprises a petroleum wax. When the zirconium compound or titanium compound is provided in liquid form, it is often desirable to add a carrier to the composition to bind the zirconium or titanium compound. A commonly used carrier is silica. When dark colored or black rubber compositions are to be formulated it is possible to use carbon black as a carrier. When light colored or white formulas are to be made, it is possible to use titanium dioxide as a carrier to make the masterbatches of the invention. As an example, a masterbatch was formulated from the liquid tetra n-propyl zirconate by the following procedure. First, 30 grams of silica were weighed out. The silica was heated at 175° C. for 20 minutes and allowed to cool in an oven to less than 100° C. The silica lost 1.8 grams of weight during heating due to evaporation of water. Next, Okerin 1956 was heated to melting. Okerin 1956 is a petroleum wax. A 70% solution of tetra n-propyl zirconate in n-propanol, 63 g, was added to the silica and stirred to make a paste. Then 39 grams of the molten Okerin 1956 petroleum wax was stirred onto the silica paste and stirred to combine. The mixture was allowed to cool slightly and sealed in a plastic bag. The master batch uses a petroleum wax, Okerin 1956, to protect the zirconate from moisture. The silica acts as a convenient carrier to bind the liquid zirconate. The zirconate masterbatch was used in several formulations and compared to the previous studies where only the liquid form was used. In principle, it was observed that the masterbatch did protect the zirconate from decomposition by water. It was observed that the cure time of a rubber composition containing as a component the zirconate masterbatch was reduced at a specific temperature when compared to the rubber composition made by using the liquid zirconate. Referring to FIG. 11, it is apparent that the masterbatch reduced the cure time by greater than 1 minute at 130° C.

Along with enhancing the cure behavior, other beneficial results can be realized by using the masterbatch method to protect the zirconate or titanium compound from water. One formulation, RPT-56, exhibited good stability to aging combined with excellent physical properties. The stability was evident in that T90 and TS2 decreased only 0.40 minutes from day 1 to day 4 after compounding. At day 4, T90 was 4.53 minutes and TS2 was 3.05 minutes. Selected physical properties were as follows: tensile strength was greater than 150 kilograms/cm$^2$, elongation was greater than 732% and abrasion was 0.27 cc. Other advantages can be seen when comparing physical property differences between a rubber composition cured with a liquid zirconate (RPT-46) and a rubber composition cured with a masterbatch of n-propyl zirconate (RPT-55). Rubber compositions made using the masterbatch exhibited tensile strength that had an increase of 14% and an elongation increase of more than 18% relative to a rubber composition made with the same zirconate but without the masterbatch.

Processing parameters relevant to rubber outsoles are cure temperature and time. Samples with acceptable physical properties have been successfully cured in the temperature range of 100° C.–180° C. at times ranging from less than 3 minutes up to about 20 minutes. In particular, it is possible to make molded articles by molding at 180° C. or less for cure times of 20 minutes or less. More preferably, the articles may be cured at a temperature of 150° C. or less for 15 minutes or less. By adjusting the relative levels of the titanium or zirconate compounds as well as the accelerators and curing agents of the compositions, the time and temperature range of cure can be extended so that the cure temperature is 130° C. or less and the cure time is 10 minutes or less. As noted above, the titanium or zirconium compounds of the invention can be used to provide rubber compositions that cure in 10 minutes or less at a temperature of 100° C. At higher temperatures, shorter cure times are possible. For example, at 130° C., articles can be cured in 10 minutes or less and more preferably at 6 minutes or less, and at 150° C., articles can be molded in 3 minutes or less. By adjusting the level of accelerators, curing agents, and the titanium or zirconium compounds of the invention, the cure can be extended to lower and higher temperatures and times. For applications other than molding rubber outsoles, other parameters may be chosen to optimize the process.

Another benefit of the rubber compositions of the invention is that the amount of accelerators can be reduced in a rubber that is designed to cure at more conventional temperatures around 150° C. Because the amount of accelerators can be reduced in the compositions of the invention, several advantages are expected to result. Among the advantages are reductions in material cost, reduction in the environmental impact of the accelerators, and enhanced stability of the formulations.

It can be noted that other industries may use process conditions different from the ones stated above. For example, latex rubber gloves are generally cured for about 12 to about 15 minutes at 90–105° C. For latex dipped or coagulation dipped products such as condoms and gloves, the chelated titanates and the chelated zirconates may be preferred because of their enhanced hydrolysis resistance. Larger sized tires such as used in heavy industrial and aircraft applications are typically cured at about 150° C., due to the fact that these tires have a high content of natural rubber and have very thick cross-sections. When natural rubber content is high, the rubber has a tendency to revert at cure temperatures above 150° C. Accordingly, the tires are cured at 150° C. and may take hours to cure at that temperature. Passenger car tires typically have less natural rubber and thinner cross-sections. The low natural rubber content permits curing at higher temperatures, typically 180–190° C. The curing times depend on the tire size. Smaller 13" and 14" tires may have curing times of 10–12 minutes. Larger 15" and 16" tires have curing times typically of 14–18 minutes. In general, the titanium compounds and zirconium compounds of the invention may be used in such applications to reduce the temperature of cure, or alternatively to reduce the time needed for cure at a given temperature.

EXAMPLES

The invention will be illustrated with non-limiting examples of compositions and cured articles. A table containing the complete formulation of the samples referred to in the text as well as in the Figures and Tables is given at the end of the application. In the discussion that follows, formulations will usually be referred to by mentioning the key characteristic appropriate for explaining the significance of the result being discussed or illustrated.

Figure 2:
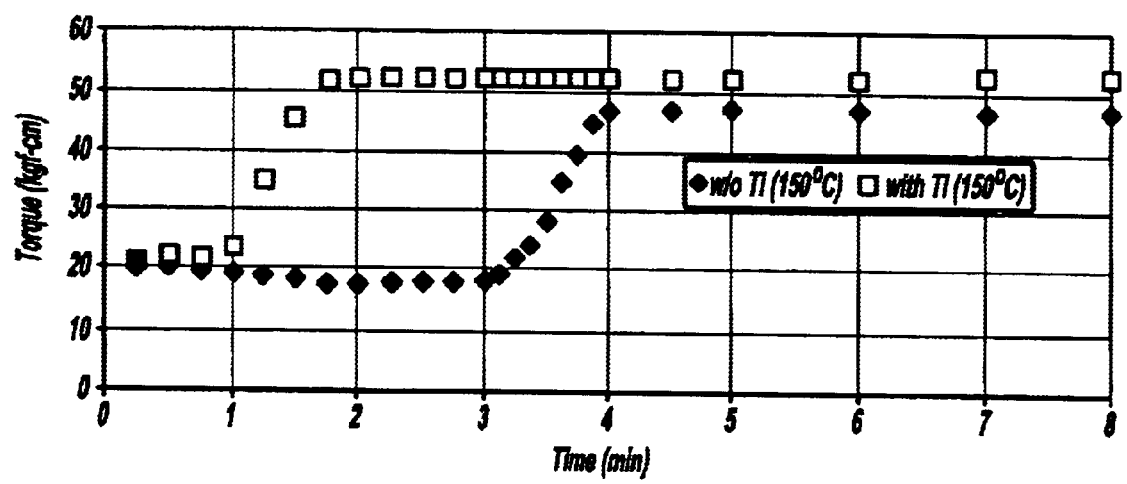
FIG. 2 shows rheometer cure curves at 150° C. of a composition with and without the auxiliary composition of the invention.

A comparison of the cure behavior of a formulation with and without a titanium compound of the invention is depicted in FIGS. 1 and 2. The test formulations are given in Table 1. In FIG. 1, the sample with the titanium compound can be cured at 130° C., whereas the sample without the titanium compound has to be run at 150° C. to obtain a comparable T90 (where T90 is the time that the cure has progressed to 90% completion). The T90 times for these formulations in given in Table 2. FIG. 2 shows the cure behavior of the formulations with and without the titanium compound when both are cured at 150° C. There is a decrease in cure time observed at 150° C. upon the addition of 2 phr (parts per 100 parts of rubber) of a titanium compound of the invention. The titanium compound used was 75% active. Therefore the actual amount added was 1.5 phr.

TABLE 1

Sample formulations with (16ST-01) and without (16D135) titanate coupling agent (AA-75); "PHR" is parts per 100 parts of rubber.

| Formulation<br>Compound | 16ST-01<br>PHR | 16D135<br>PHR |
|---|---|---|
| Polyisoprene or natural rubber | 10 | 10 |
| Acrylonitrile/butadiene rubber | 10 | 10 |
| Polybutadiene rubber | 80 | 80 |
| Homogenizing agent | 1 | 1 |
| Filler (silica) | 48 | 48 |
| Zinc oxide | 5 | 5 |
| Stearic acid | 1 | 1 |
| Butylated hydroxytoluene | 1 | 1 |
| Okerin 1956 anti-blooming agent | 0.5 | 0.5 |
| Polyethylene glycol | 3 | 3 |
| Rhenofit 1987 | 1 | 1 |
| Diisopropyl titanium acetylacetonate (75%) | 2 | 0 |
| Carbon black in polymeric binder | 2 | 2 |
| Curative Package | | |
| Sulfur (crosslinker) | 1.8 | 1.8 |
| Sulfenamide accelerator | 1.3 | 1.3 |
| Thiuram accelerator | 0.5 | 0.5 |
| Dithiophosphate accelerator | 0.5 | 0.5 |

TABLE 2

Ts2 and T90 for the formulations in Table 1 at selected temperatures.

| Formulation<br>Temperature | 16ST-01<br>130 | 16ST-01<br>150 | 16D135<br>130 | 16D135<br>150 |
|---|---|---|---|---|
| Ts2 | 2.38 | 0.80 | 7.18 | 3.17 |
| T90 | 3.55 | 1.50 | 8.40 | 3.82 |

Note:
"T90" is the time for the cure to progress to 90% completion
"Ts2" is an arbitrary value related to the scorch time. It is the time for a 2 point rise in the Mooney viscosity above the minimum value.

In FIG. 1 and Table 2, it is seen that the cure builds up more slowly (that is, there is a less steep transition region) for the sample with the titanium compound cured at 130° C. than for the sample cured at 150° C. without the titanium compound. It is believed that the slower build up of cure provides an easier to process compound that is more forgiving of the variability inherent in manufacturing. A cure that is too quick, on the other hand, would be harder to control and may not allow for appropriate network development in the cured article.

Figure 3:
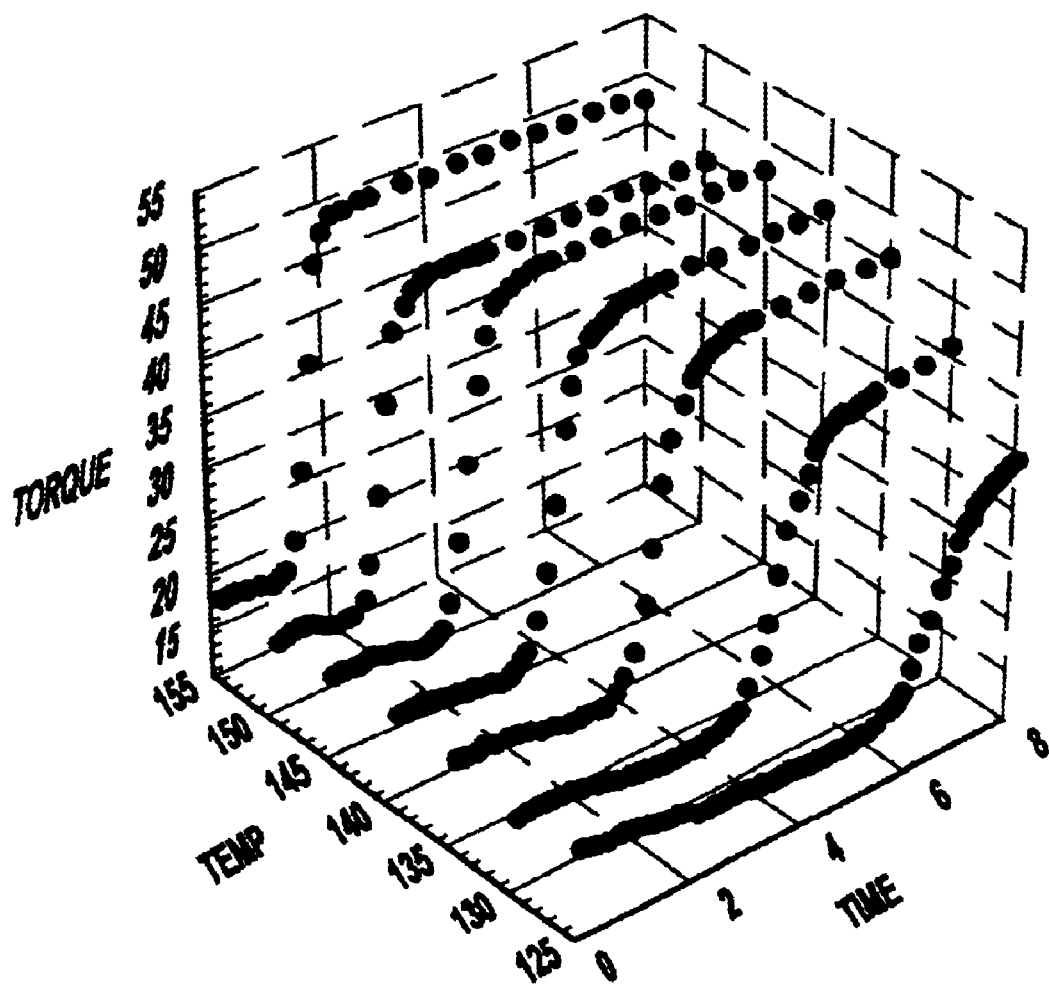
FIG. 3 shows rheometer cure curves of a composition of the invention at different temperatures.

FIG. 3 depicts the cure behavior in a 3-D graph. FIG. 3 shows how the cure behavior changes with temperature between 125° C. and 155° C. In the formulation RPT-01 of FIG. 3, the cure is not fully developed in 8 minutes at 125° C. but it does reach a plateau, indicating a completed cure, in less than 8 minutes at the other temperatures. Other formulations have been developed that reach complete cure at temperatures of 125° C. and lower in less than 8 minutes. Formulations RPT-22 and RPT-24 are representative examples of such formulations. The T90 time for the two formulations is about 4.5 minutes at 120° C.

The physical properties are in line with other formulations cured at higher temperatures. Sample physical property data are shown in Table 3 for samples cured at temperatures between 110° C. and 150° C. One problem often observed when processing rubber composition is that the rubber compositions can be overcured, which results in reduced physical properties. The problem of overcure is not as pronounced in the rubber compositions of the invention. For example see the two entries in Table 3 for example RPT-15.

The first entry, showing cure at 130° C. for 6 minutes was for a time of T90+1 minute. The second entry for RPT15 showing a cure at 130° C. for 9 minutes was for a time of T90+4 minutes. The physical properties of the two cured articles were comparable. Such reduced sensitivity to overcure could be useful in the production for example, of rubber outsoles. Such rubber outsoles are typically cured for a time in the range of about T90 to T90+1 minute. From Table 3, it can be seen that continuing the cure past T90+1 minute for an additional 3 minutes has very little effect on the physical properties.

Figure 6:
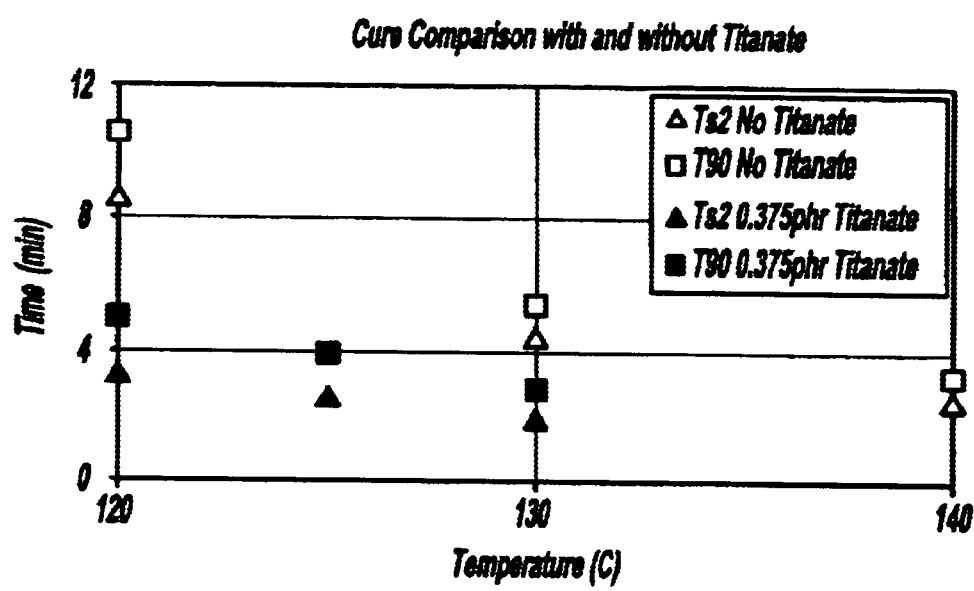
FIG. 6 is a comparison of the cure behavior of a rubber compound with and without an auxiliary composition of the invention.

FIG. 6 illustrates the decrease in cure temperature achievable with rubber compositions of the invention. By adding 0.375 phr of a titanium compound of the invention (diisopropyl titanium acetylacetonate), the cure time at 120° C. and 130° C. was significantly affected. In this case, Ts2 and T90 were reduced significantly. At 120° C. the reduction was 61%.

accelerators. The titanium and zirconium compounds of the invention enable the cure temperature to be reduced in every case.

By adjusting the ratio of accelerators, formulations have been developed which have good aging stability coupled with an initially slower cure. The increased stability with a slightly slower cure could be an advantage in the following scenario. Rubber compositions are to be formulated in a central location and then shipped to factories over a wide area. For example, there might be factories for molding rubber compositions in Asia and Central America. The cure of the rubber compositions of the invention can be adjusted so they are stable for a long time at ambient conditions, but too slow to cure in reasonable production times during the first week or more after compounding. Such would allow for shipping and storage time. The molding facilities to which the rubber compositions are shipped and distributed would not need a full complement of rubber processing equipment.

TABLE 3

Sample physical test data for several formulations and a variety of cure conditions.

| | | Formulation | | | | | |
|---|---|---|---|---|---|---|---|
| Test Item | Test Result | RPT-01 | RPT-01 | RPT-06 | RPT-15 | RPT-15 | RPT-15 |
| Hardness | Shore A | 69–71 | 67–68 | 68–69 | 66–68 | 67–68 | 65–66 |
| Tensile | kg/cm2 | 134 | 117 | 114 | 109 | 109 | 134 |
| Elongation | % | 573 | 595 | 595 | 526 | 511 | 610 |
| Tear | kg/cm | 38 | 37 | 38 | 34 | 36 | 47 |
| 300% Modulus | kg/cm2 | 50 | 34 | 36 | 43 | 41 | 39 |
| SPE. Gravity | | 1.14 | 1.16 | 1.13 | 1.14 | 1.12 | 1.13 |
| Abrasion | 6 LB/3000 | 0.18 | 0.15 | 0.33 | 0.19 | 0.20 | 0.19 |
| Cure Conditions* | | 130° C. 6'30" | 150° C. 3'00" [6 days] | 110° C. 9'00" [3 days] | 130° C. 9'00" [1 day] | 130° C. 9'00" [1 day] | 125° C. 5'00" [19 days] |

| | | Formulation | | | | | |
|---|---|---|---|---|---|---|---|
| Test Item | Test Result | RPT-16 | RPT-16 | RPT-22 | RPT-27 | RPT-31 | RPT-33 |
| Hardness | Shore A | 65–67 | 66–67 | 63–65 | 65–66 | 67–68 | 67–68 |
| Tensile | kg/cm2 | 111 | 120 | 131 | 131 | 166 | 136 |
| Elongation | % | 551 | 562 | 760 | 701 | 1097 | 597 |
| Tear | kg/cm | 34 | 37 | 39 | 49 | 47 | 45 |
| 300% Modulus | kg/cm2 | 37 | 41 | 30 | 33 | 29 | 41 |
| SPE. Gravity | | 1.13 | 1.12 | 1.13 | 1.13 | 1.15 | 1.12 |
| Abrasion | 6 LB/3000 | 0.21 | 0.19 | 0.28 | 0.28 | 0.14 | 0.30 |
| Cure Conditions* | | 130° C. 6'00" [9 days] | 125° C./ 5'00" [19 days] | 120° C. 5'30" | 125° C. 6'00" [11 days] | 130° C. 6'30" | 125° C. 5'00" |

*Cure conditions - temperature time [days post-addition of curatives].

Figure 4:
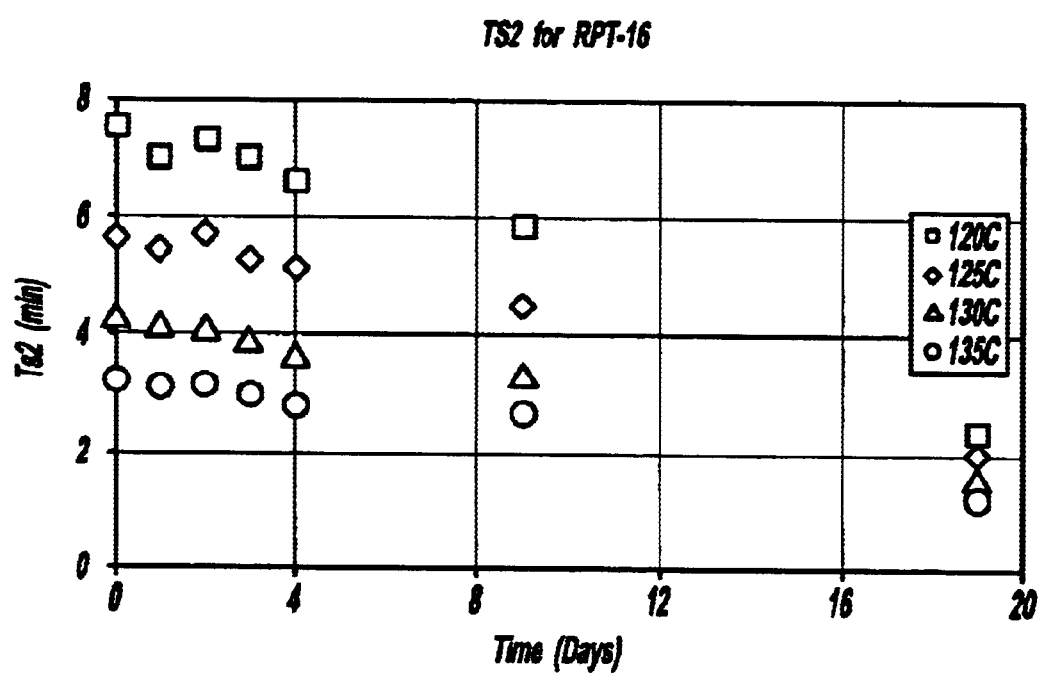
FIG. 4 is a plot of the Ts2 time against the number of days storage at room temperature of the uncured rubber composition.
Figure 5:
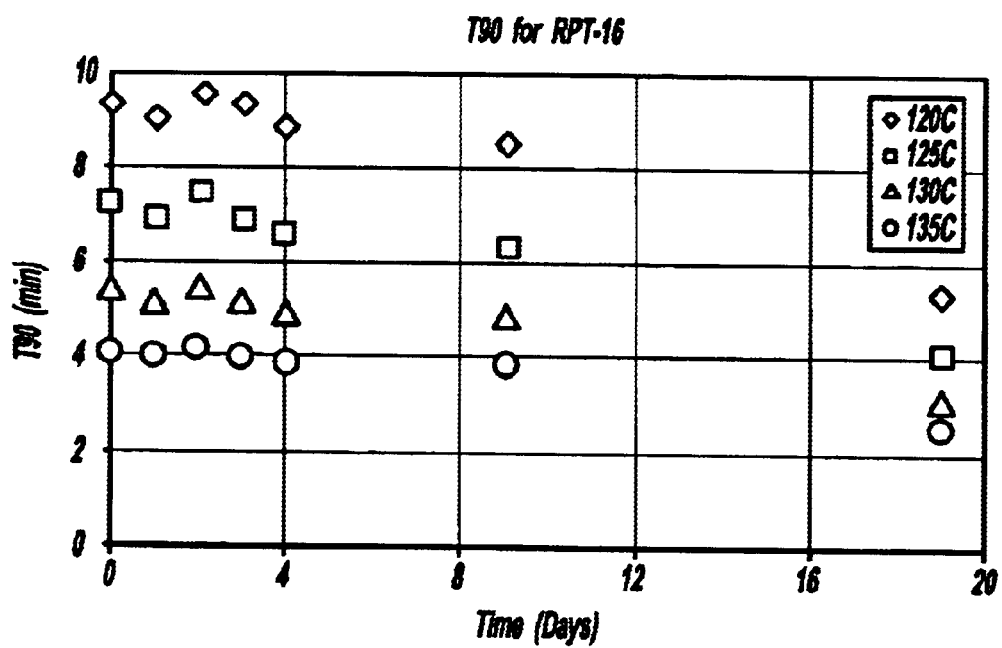
FIG. 5 is a plot of T90 versus days of storage of an uncured rubber composition at room temperature.

The rubber compositions of the invention also exhibit good stability as defined in the changes in Ts2 (related to scorch time) and T90 over time. A typical rubber formulation of the prior art is in general processable only for 3–5 days after compounding. The short "shelf life" of such rubber compositions is due to the fact that the rubber once compounded with curing agents tends to cure slowly even at ambient temperatures. The slow cure renders the rubber unprocessable after a few days. It has surprisingly been found that compositions containing the titanium or zirconium compounds of the invention exhibit long shelf lives. In FIGS. 4 and 5, Ts2 and T90 are shown at 120, 125, 130, and 135° C. for up to 19 days for formulation RPT16. At 130 and 135° C., the systems exhibited almost no change over the first 9 days, especially for T90. The samples could be molded at 125° C. for 5 minutes following 19 days of storage at ambient conditions with no process difficulties and with resulting good physical properties (see Table 3). Cure studies have been done with a number of different This would be advantageous because the formulator could save the capital expense of providing the facilities with that equipment. Another advantage resulting from the use of the rubber compositions of the invention as described above, is that the batch and final product consistency is improved because only one source can make compositions for use at multiple molding facilities. As discussed above, with rubber compositions of the prior art, the compositions tended to cure even at ambient temperatures so that after storage for a period of time either at the compounding facility or in transit, the rubber composition would be rendered useless for producing molded articles. In contrast, the rubber compositions of the invention are stable for a period of more than 4 days, preferably longer than a week, and up to 19 days and longer at ambient temperatures, and still are capable of being molded into acceptable industrial articles at a molding facility.

Table 4 shows the results of wet and dry friction tests on herringbone outsole test pieces evaluated on a wood court surface. The compositions of the invention represented by RPT33 and RPT 13 in Table 4 had wet and dry traction comparable to standard rubber formulations cured at higher temperatures, thus exhibiting their utility in footwear, especially athletic footwear, such as basketball shoes requiring good traction.

TABLE 4

Traction tests on herringbone samples.

| | Traction Tests on RPT-33 | | | | Traction Tests on RPT-13 | | | |
|---|---|---|---|---|---|---|---|---|
| | $\mu$static | $\mu$min | $\mu$avg | $\mu$max | $\mu$static | $\mu$min | $\mu$avg | $\mu$max |
| Dry | 1.11 | 1.05 | 1.08 | 1.10 | 1.08 | 1.07 | 1.09 | 1.11 |
| Wet | 0.71 | 0.34 | 0.40 | 0.56 | 0.72 | 0.36 | 0.46 | 0.56 |

Note: mean of 5 trials on dry and wet wood court.

Another surprising advantage of rubber compositions of the invention is that samples can be made that can be successfully cured at temperatures as low as 100° C. In general, curing at low temperatures is associated with relatively long cure times. Often such a long cure time would not be practical, for example such as in production of shoe outsoles. However, for a variety of reasons it may be desirable to cure at such a relatively low temperature. Until the rubber compositions of the invention, it was not to be expected that sulfur cured rubber compositions could be processed at such a low temperature and develop acceptable physical properties. Another surprising benefit was the excellent abrasion resistance (Table 3), since low temperature rubber compounds tend to be undercured and easily abraded. The excellent abrasion resistance, which is comparable to compositions cured at elevated temperatures, makes these compositions of the present invention especially beneficial for high wear applications such as, but not limited to, footwear and tires.

Figure 10:
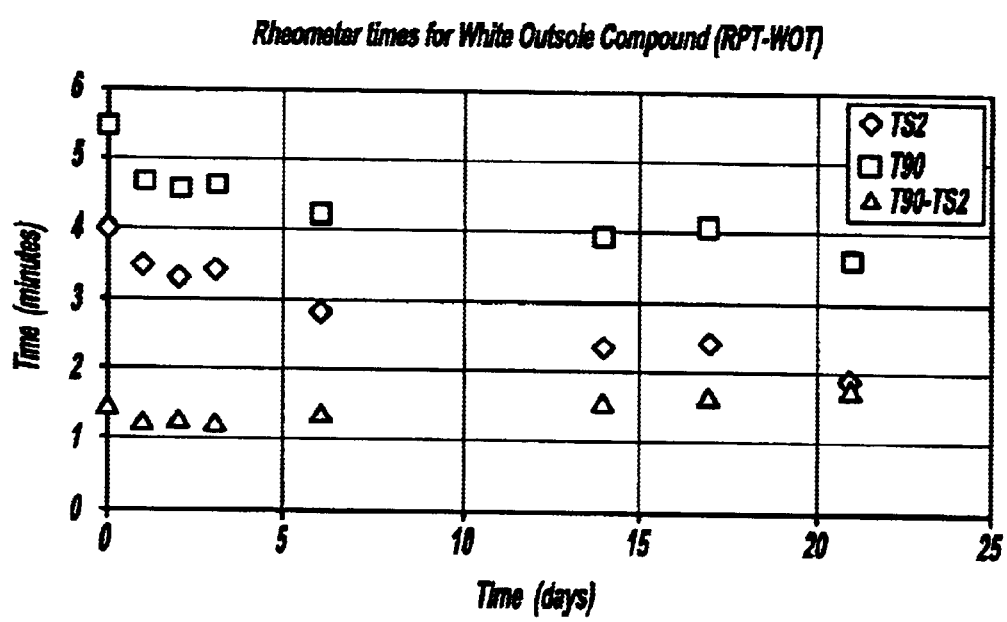
FIG. 10 shows aging stability after compounding and before curing of a shoe sole compound containing a titanium compound of the invention.

Rubber compositions of the invention may also contain a wide variety of black, white or colored pigments. As noted above, carbon black may be used in the formulations as well as titanium dioxide. Other rubber pigment compounds may be used in the rubber composition of the invention without affecting the cure properties. FIG. 10 shows a white composition RPT-WOT suitable for a shoe outsole or other white rubber goods. This composition exhibited excellent stability for 3 weeks after compounding.

Figure 7:
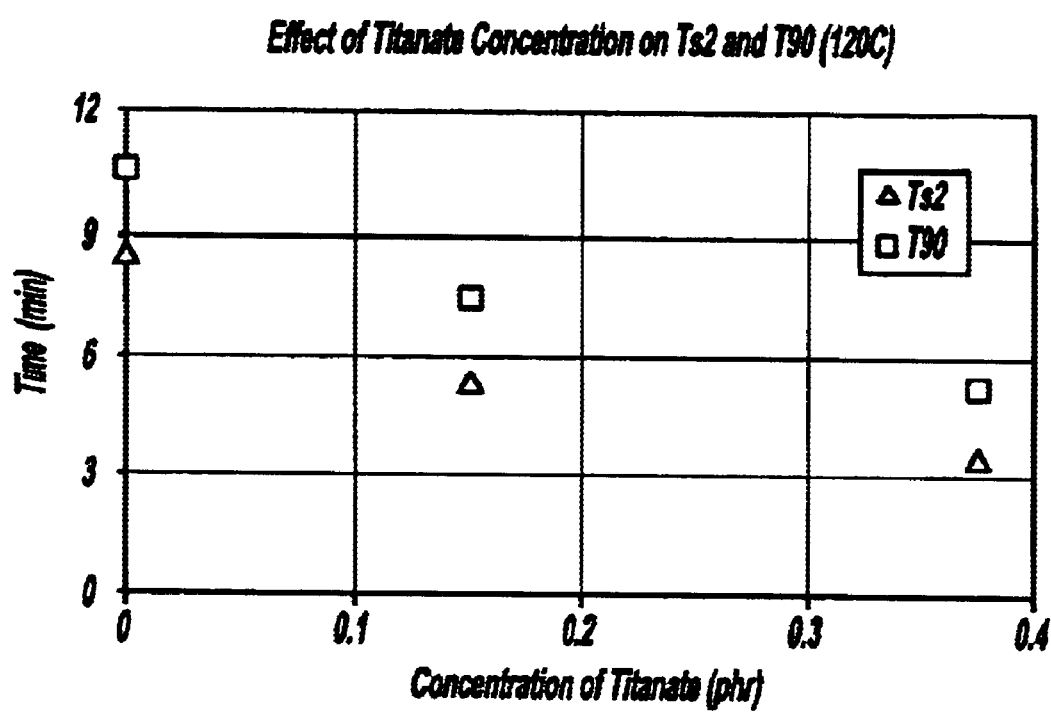
FIG. 7 is a comparison of the cure behavior of a rubber compound at 120° C. as a function of titanate compound concentration.

FIG. 7 demonstrates the concentration effect of a titanium compound of the invention. From FIG. 7, it can be seen that relatively low amounts of the titanium compound can effectively reduce the cure times and cure temperature of a rubber composition. At the lower concentrations, the effect is not as pronounced. Shoe outsoles were successfully molded form the composition containing 0.15 phr of diisopropyl titanium acetylacetonate (RPT 42). The cure parameters in this case were 130° C. for 5 minutes.

Figure 8:
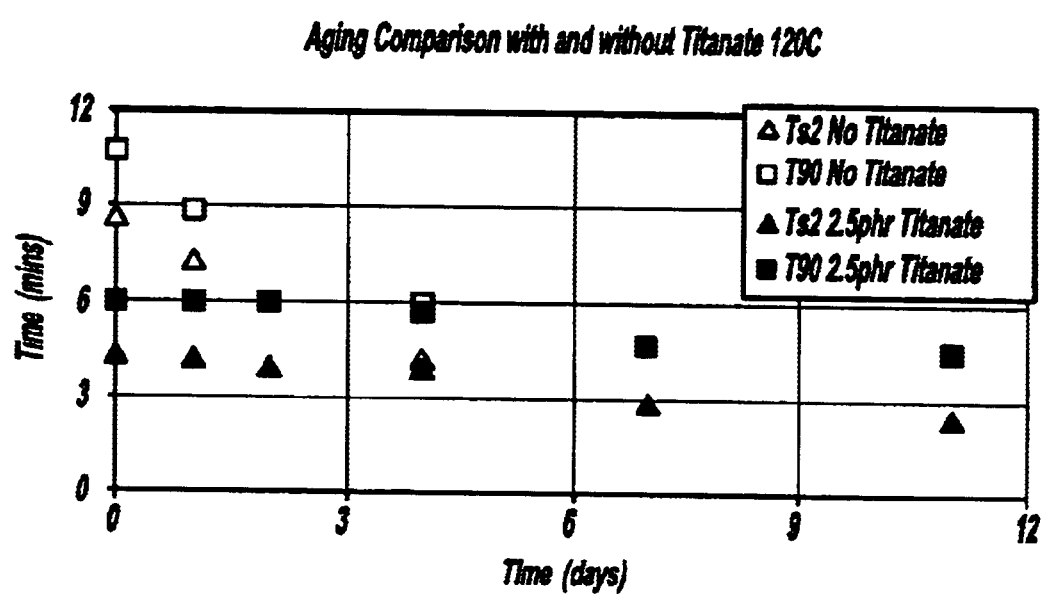
FIG. 8 is a comparison of the aging stability after compounding and before curing of a rubber composition of the invention.

FIG. 8 shows the relatively greater aging stability achieved by formulating a rubber composition with 2.5 phr resin of a titanium compound of the invention. The formulation with the titanium compound cures in approximately ½ the time required to cure the formulation without the titanium compound when initially compounded (day 0). After 4 days, the cure times are essentially identical.

Figure 9:
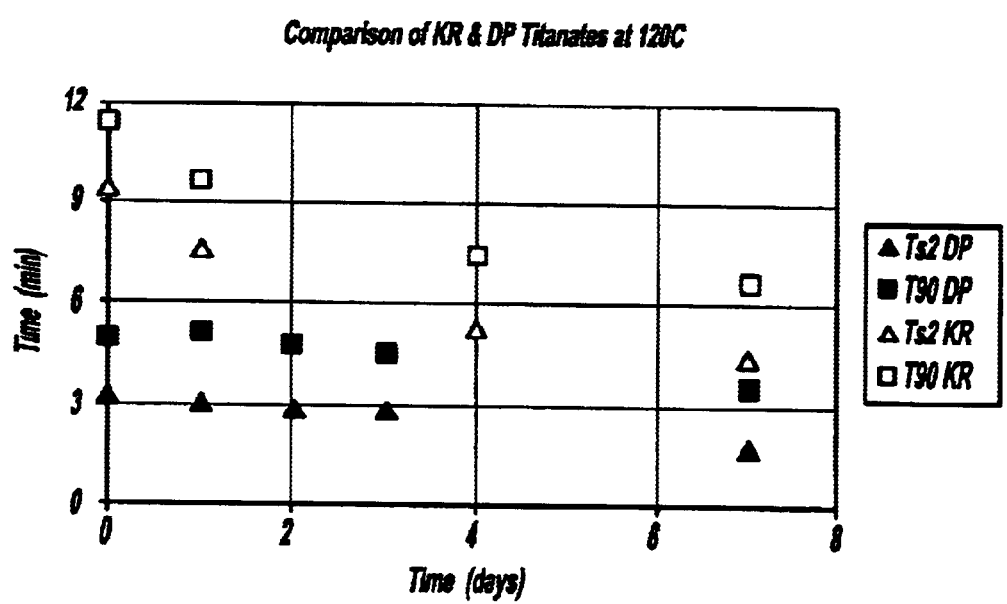
FIG. 9 is a comparison of the cure behavior of titanium compounds of different structure.

As stated earlier, the length of the alkyl group R in the titanium or zirconium compounds has an effect on the curing temperatures and rates of the rubber compositions. Generally, it has been found that alkyl groups of 8 carbons or less are effective in compositions of the invention. FIG. 9 illustrates the difference in cure behavior between titanium compounds with R groups greater than 8 (neopentyl(diallyl) oxytrineodecanoyl titanate, indicated as KR in the Figure) on the one hand and a titanium compound with an alkyl group of 8 or less carbons (diisopropyl titanium acetylacetonate, indicated as DP in the Figure). In FIG. 9, KR is at 1 phr while DP is at 0.375 phr. On the initial day of compounding, and for up to three days following, the composition indicated as DP has an almost invariant T90 around 4.75 minutes. This T90 is suitable for production of shoe outsoles and a host of other goods. The composition labeled KR, with the long, pendant alkyl groups bonded to the titanium has a T90 of 11.5 minutes at initial compounding. The T90 reduces for several days, showing its instability; however, it never reaches a T90 suitable for production after a week at ambient temperature. This shows that higher molecular weight alkyl groups are ineffective to produce the results obtained with shorter alkyl groups.

The following Table 5 illustrates the composition of the RPT examples discussed above in relation to the figures and the tables. The examples illustrate typical rubber additives used in the rubber compositions of the invention, as well as illustrative ranges of levels of the additives. The examples are offered for illustrative purposes and are not limiting except as reflected in the appended claims.

In Table 5, Tyzor® AA-75 is a 75% solution in isopropanol of O,O-diisopropyl titanium diacetylacetonate. Tyzor BTP is poly n-butyl titanate. Rhenofit® 1987 is a commercially available activator sold by Rhein Chemie. The carbon black in Table 5 was added in the form of a carbon black in a polymeric binding system, sold for use in the manufacture of black rubber compounds. The formulation RPT-WOT additionally contained 0.3 phr of a blue pigment, and 0.5 phr of a second antioxidant.

TABLE 5

| Additive, phr: | RPT-01 | RPT-06 | RPT-13 | RPT-15 | RPT-16 |
|---|---|---|---|---|---|
| Polyisoprene rubber | | | 10 | | |
| Acrylonitrile-butadiene rubber | | | 10 | | |
| Polybutadiene rubber | 70 | 80 | 70 | 70 | 70 |
| Styrene-acrylonitrile-butadiene rubber | 30 | | | 30 | 30 | 30 |
| silica | 42 | 48 | 40 | 40 | 40 |
| Zinc oxide | 5 | 5 | 5 | 5 | 5 |
| Stearic acid | 1 | 1 | 1 | 1 | 1 |
| BHT (antioxidant) | 1 | 1 | 1 | 1 | 1 |
| Anti-blooming agent | 0.5 | 0.5 | 0.5 | 0.5 | 0.5 |
| Polyethylene glycol | 3 | 3 | 3 | 3 | 3 |
| Rhenofit 1987 | 1 | 1 | 1 | 1 | 1 |
| Carbon black | 2 | 2 | 2 | 2 | 2 |
| Rutile TiO$_2$ | | | | | |
| Tyzor ® AA-75 | 2 | 3 | 2 | 2.5 | 2.5 |
| Tyzor BTP | | | | | |
| Tetra-n-butyl titanate | | | | | |
| Tetra-n-propyl zirconate | | | | | |
| Tetra-n-propyl zirconate masterbatch | | | | | |
| Curative package: | | | | | |
| Sulfur (crosslinker) | 1.8 | 1.8 | 2.5 | 2 | 2 |
| Sulfenamide accelerator | 1.3 | 1.3 | 1.3 | 1.3 | 1.7 |
| Thiuram accelerator | 0.5 | 0.3 | 0.5 | 0.4 | 0.5 |
| Dithiophosphate accelerator | 0.5 | 0.5 | 0.9 | 0.5 | 0.5 |

| Additive, phr: | RPT-24 | RPT-27 | RPT-31 | RPT-33 | RPT-43 |
|---|---|---|---|---|---|

TABLE 5-continued

| Additive | | | | | |
|---|---|---|---|---|---|
| Polyisoprene rubber | 10 | 10 | 10 | 10 | 10 |
| Acrylonitrile-butadiene rubber | 15 | 15 | 15 | 15 | 15 |
| Polybutadiene rubber | 75 | 75 | 75 | 75 | 75 |
| Styrene-acrylonitrile-butadiene rubber | | | | | |
| silica | 44 | 44 | 44 | 44 | 44 |
| Zinc oxide | 3 | 3 | 3 | 3 | 3 |
| Stearic acid | 1 | 1 | 1 | 1 | 1 |
| BHT (antioxidant) | 1 | 1 | 1 | 1 | 1 |
| Anti-blooming agent | 1 | 1 | 1 | 1 | 1 |
| Polyethylene glycol | 2.5 | 2.5 | 2.5 | 2.5 | 2.5 |
| Rhenofit 1987 | 1 | 1 | 1 | 1 | 1 |
| Carbon black | 1.5 | 1.5 | 1.5 | 1.5 | 1.5 |
| Rutile TiO$_2$ | | | | | |
| Tyzor ® AA-75 | 3 | 3 | 3 | 0.5 | |
| Tyzor BTP | | | | | 3 |
| Tetra-n-butyl titanate | | | | | |
| Tetra-n-propyl zirconate | | | | | |
| Tetra-n-propyl zirconate masterbatch | | | | | |
| Curative package: | | | | | |
| Sulfur (crosslinker) | 1.8 | 1.8 | 1.8 | 1.8 | 1.8 |
| Sulfenamide accelerator | 1.5 | 1.5 | 1.8 | 1.5 | 1.5 |
| Thiuram accelerator | 0.7 | 0.25 | 0 | 0.6 | 0.6 |
| Dithiophosphate accelerator | 0.7 | 0.5 | 0.5 | 0.5 | 0.5 |

| Additive, phr: | RPT-46 | RPT-55 | RPT-56 | RPT-WOT |
|---|---|---|---|---|
| Polyisoprene rubber | 10 | 10 | 10 | 18 |
| Acrylonitrile-butadiene rubber | 15 | 15 | 15 | |
| Polybutadiene rubber | 75 | 75 | 75 | 82 |
| Styrene-acrylonitrile-butadiene rubber | | | | |
| silica | 44 | 44 | 44 | 42 |
| Zinc oxide | 3 | 3 | 3 | 3 |
| Stearic acid | 1 | 1 | 1 | 1 |
| BHT (antioxidant) | 1 | 1 | 1 | 1 |
| Anti-blooming agent | 1 | | | 0.5 |
| Polyethylene glycol | 2.5 | 2.5 | 2.5 | 3 |
| Rhenofit 1987 | 1 | 1 | 1 | 1 |
| Carbon black | 1.5 | 1.5 | 1.5 | |
| Rutile TiO$_2$ | | | | 10 |
| Tyzor ® AA-75 | | | | |
| Tyzor BTP | | | | |
| Tetra-n-butyl titanate | | | | 2 |
| Tetra-n-propyl zirconate | 2 | | | |
| Tetra-n-propyl zirconate masterbatch | | 3 | 3 | |
| Curative package: | | | | |
| Sulfur (crosslinker) | 1.8 | 1.8 | 2 | 2.2 |
| Sulfenamide accelerator | 1.5 | 1.5 | 0.2 | 1 |
| Thiuram accelerator | 0.6 | 0.6 | 1 | 0.3 |
| Dithiophosphate accelerator | 0.5 | 0.5 | 0.4 | 0.5 |

The invention has been described above with respect to various preferred embodiments. Other variations will be apparent to those of skill in the art. Accordingly, the invention is not to be limited by any of the above disclosure, except as provided in the appended claims.

I claim:

1. A moldable rubber composition comprising:
   a rubber resin selected from the group consisting of natural rubber, synthetic rubber, and mixtures thereof, wherein the synthetic rubber comprises a backbone comprising repeating olefinic unsaturation;
   a sulfur containing curing agent;
   an auxiliary composition comprising petroleum wax and 0.01–10 phr resin of a metal compound selected from the group consisting of a titanium compound with at least one alkoxy group —OR bonded to titanium, a zirconium compound with at least 1 alkoxy group OR bonded to zirconium, and mixtures thereof.

2. A rubber composition according to claim 1, wherein the metal compound is provided in liquid form and the auxiliary composition further comprises a carrier to bind the metal compound.

3. A rubber composition according to claim 2, wherein the carrier comprises silica.

4. A rubber composition according to claim 2, wherein the carrier comprises carbon black.

5. A rubber composition according to claim 2, wherein the carrier comprises titanium dioxide.

6. A rubber composition according to claim 1, wherein the metal compound comprises a titanium compound.

7. A rubber composition according to claim 1, wherein the metal composition comprises a zirconium compound.

8. A method of molding a rubber article, comprising heating a composition according to claim 1 above 90° C. for a time sufficient to effect cure.

9. A method of molding a rubber article, comprising mixing a moldable rubber composition according to claim 1, wherein the composition is exposed after mixing to cure parameters sufficient to effect cure.

10. A moldable rubber composition, comprising
    a rubber resin selected from the group consisting of natural rubber, synthetic rubber and mixtures thereof, wherein the synthetic rubber comprises a backbone comprising repeating olefinic unsaturation;
    a sulfur containing curing agent; and
    0.01–10 parts per hundred resin of a metal compound selected from the group consisting of a titanium compound with at least one alkoxy group —OR bonded to titanium, a zirconium compound with at least one alkoxy group —OR bonded to zirconium, and mixtures thereof, wherein R comprises an alkyl group of 8 or fewer carbon atoms,
    wherein the titanium and zirconium compounds are complexed with an organic ligand selected from the group consisting of acetylacetonate, ethyl acetylacetonate, lactic acid, glycolic acid, citric acid, salts thereof, and esters thereof.

11. A composition according to claim 10, wherein the ligand is selected from the group consisting of lactic acid, glycolic acid, citric acid, salts thereof, and esters thereof.

12. A composition according to claim 10, wherein the metal compound comprises titanium acetylacetonate.

13. A composition according to claim 10, wherein the metal compound comprises zirconium acetylacetonate.

14. A composition according to claim 10, further comprising silica filler.

15. A composition according to claim 14, comprising 40 to 48 phr silica.

16. A composition according to claim 10, further comprising a petroleum wax.

17. A method of molding a rubber article, comprising heating a composition according to claim 10 above 90° C. for a time sufficient to effect cure.

18. A method of molding a rubber article, comprising mixing a moldable rubber composition according to claim 10, wherein the composition is exposed after mixing to cure parameters sufficient to effect cure.

19. A moldable rubber composition, comprising
   a rubber resin selected from the group consisting of natural rubber, synthetic rubber and mixtures thereof, wherein the synthetic rubber comprises a backbone comprising repeating olefinic unsaturation;
   silica filler;
   a sulfur containing curing agent; and
   0.01–10 parts per hundred resin of a metal compound selected from the group consisting of a titanium compound with at least one alkoxy group —OR bonded to titanium, a zirconium compound with at least one alkoxy group —OR bonded to zirconium, and mixtures thereof, wherein R comprises an alkyl group of 8 or fewer carbon atoms.

20. A composition according to claim 19, comprising 40 to 48 phr silica.

21. A composition according to claim 19, wherein the titanium and zirconium compounds are complexed with an organic ligand that contains two atoms or functional groups capable of forming covalent or dative bonds to the titanium or zirconium.

22. A composition according to claim 21, wherein the ligand is selected from the group consisting of acetylacetonate, ethyl acetylacetonate, triethanolamine, lactic acid, glycolic acid, citric acid, salts thereof, and esters thereof.

23. A composition according to claim 19, wherein the metal compound comprises titanium acetylacetonate.

24. A composition according to claim 19, wherein the metal compound comprises zirconium acetylacetonate.

25. A composition according to claim 19, further comprising petroleum wax.

26. A method of molding a rubber article, comprising heating a composition according to claim 19, above 90° C. for a time sufficient to effect cure.

27. A method of molding a rubber article, comprising mixing a moldable rubber composition according to claim 19, wherein the composition is exposed after mixing to cure parameters sufficient to effect cure.

28. A method for producing a rubber footwear component, comprising heating a moldable rubber composition above 90° C. for a time sufficient to effect cure, wherein the moldable rubber composition comprises
   a rubber resin selected from the group consisting of natural rubber, synthetic rubber and mixtures thereof, wherein the synthetic rubber comprises a backbone comprising repeating olefinic unsaturation;
   a sulfur containing curing agent; and
   0.01–10 parts per hundred resin of a metal compound selected from the group consisting of a titanium compound with at least one alkoxy group —OR bonded to titanium, a zirconium compound with at least one alkoxy group —OR bonded to zirconium, and mixtures thereof, wherein R comprises an alkyl group of 8 or fewer carbon atoms.

29. A method according to claim 28, comprising heating the moldable rubber composition at a temperature of 150° C. or less.

30. A method according to claim 28, comprising heating the moldable rubber composition at a temperature of 130° C. or less.

31. A method according to claim 28, comprising heating the moldable rubber composition at a temperature of 120° C. or less.

32. A method according to claim 28, comprising heating moldable rubber composition at a temperature of 100° C. or less.

33. A method according to claim 28, wherein the metal compound comprises a titanium atom complexed with a chelating ligand.

34. A method according to claim 28, wherein the metal compound comprises a zirconium atom complexed with a chelating ligand.

35. A method for producing a rubber footwear component, comprising mixing a moldable rubber composition comprising
   a rubber resin selected from the group consisting of natural rubber, synthetic rubber and mixtures thereof, wherein the synthetic rubber comprises a backbone comprising repeating olefinic unsaturation;
   a sulfur containing curing agent; and
   0.01–10 parts per hundred resin of a metal compound selected from the group consisting of a titanium compound with at least one alkoxy group —OR bonded to titanium, a zirconium compound with at least one alkoxy group —OR bonded to zirconium, and mixtures thereof, wherein R comprises an alkyl group of 8 or fewer carbon atoms,
wherein the rubber composition is heated after mixing to a temperature of 90° C. or greater for a time sufficient to effect cure.

36. A method according to claim 35, wherein the heating to effect cure is carried out 4 days or longer after the mixing step.

37. A method according to claim 35, wherein the heating to effect cure is carried out 10 days or longer after the mixing step.

38. A method according to claim 35, wherein the heating to effect cure is carried out 19 days or longer after the mixing step.

39. A method according to wherein the titanium and zirconium compounds are complexed with an organic ligand that contains two atoms or functional groups capable of forming covalent or dative bonds to the titanium or zirconium.

40. A method according to claim 39, wherein the ligand is selected from the group consisting of acetylacetonate, ethyl acetylacetonate, triethanolamine, lactic acid, glycolic acid, citric acid, salts thereof, and esters thereof.

41. A method according to claim 35, wherein the metal compound comprises titanium acetylacetonate.

42. A method according to claim 35, wherein the metal compound comprises zirconium acetylacetonate.

43. A method according to claim 35, wherein the moldable rubber composition further comprises a silica filler.

44. A method according to claim 43, wherein the moldable rubber composition comprises 40 to 48 phr silica.

45. A method of producing cured rubber articles comprising:
   formulating a moldable rubber composition at a central compounding facility; and
   shipping the rubber composition to a molding facility, wherein at the molding facility, the rubber composition is exposed to cure parameters sufficient to cure the rubber composition,
wherein the rubber composition comprises:
   a rubber resin selected from the group consisting of natural rubber, synthetic rubber and mixtures thereof, wherein the synthetic rubber comprises a backbone comprising repeating olefinic unsaturation;

a sulfur containing curing agent; and 0.01–10 parts per hundred resin of a metal compound selected from the group consisting of a titanium compound with at least one alkoxy group —OR bonded to titanium, a zirconium compound with at least one alkoxy group —OR bonded to zirconium, and mixtures thereof, wherein R comprises an alkyl group of 8 or fewer carbon atoms, wherein exposing to cure parameters to effect cure occurs 4 days or longer after formulating the rubber composition at the central compounding facility.

46. A method according to claim 45, wherein exposing to cure parameters to effect cure occurs 10 days or longer after formulating the rubber composition at the central compounding facility.

47. A method according to claim 45, wherein exposing to cure parameters to effect cure occurs 19 days or longer after formulating the rubber composition at the central compounding facility.

48. A method according to claim 45, wherein the rubber composition is exposed to a temperature of 90° C. or greater to effect cure.

49. A method according to claim 45, wherein the rubber composition is exposed to a temperature of 150° C. or less to effect cure.

50. A method according to claim 45, wherein the titanium and zirconium compounds are complexed with an organic ligand that contains two atoms or functional groups capable of forming covalent or dative bonds to the titanium or zirconium.

51. A method according to claim 50, wherein the ligand is selected from the group consisting of acetylacetonate, ethyl acetylacetonate, triethanolamine, lactic acid, glycolic acid, citric acid, salts thereof, and esters thereof.

52. A method according to claim 45, wherein the metal compound comprises titanium acetylacetonate.

53. A method according to claim 45, wherein the metal compound comprises zirconium acetylacetonate.

54. A method according to claim 45, wherein the molded rubber article is a shoe outsole.

55. A method for producing a rubber article comprising:

placing a moldable rubber composition in a fusible alloy mold and heating said moldable rubber composition above 90° C. and below 140° C. for a sufficient time to effect cure, wherein the moldable rubber composition comprises a rubber resin selected from the group consisting of natural rubber, synthetic rubber and mixtures thereof, wherein the synthetic rubber comprises a backbone comprising repeating olefinic unsaturation;

a sulfur containing curing agent; and an auxiliary composition comprising 0.01–10 parts per hundred resin of a metal compound selected from the group consisting of a titanium compound with at least one alkoxy group —OR bonded to titanium, a zirconium compound with at least one alkoxy group —OR bonded to zirconium and mixtures thereof, wherein R comprises an alkyl group of 8 or fewer carbon atoms.

56. A method according to claim 55, where the fusible alloy mold melts at temperatures less than 140° C.

57. A method according to claim 55, wherein the rubber article is a shoe outsole.

58. A method according to claim 55, wherein the titanium and zirconium compounds are complexed with an organic ligand that contains two atoms or functional groups capable of forming covalent or dative bonds to the titanium or zirconium.

59. A method according to claim 55, wherein the ligand is selected from the group consisting of acetylacetonate, ethyl acetylacetonate, triethanolamine, lactic acid, glycolic acid, citric acid, salts thereof, and esters thereof.

60. A method according to claim 55, wherein the metal compound comprises titanium acetylacetonate.

61. A method according to claim 55, wherein the metal compound comprises zirconium acetylacetonate.

* * * * *

UNITED STATES PATENT AND TRADEMARK OFFICE
CERTIFICATE OF CORRECTION

PATENT NO. : 6,620,871 B2
DATED : September 16, 2003
INVENTOR(S) : Thomas Woodrow Wilson, III It is certified that error appears in the above-identified patent and that said Letters Patent is hereby corrected as shown below:

Column 2,
Lines 32, "100° C. 200° C." should be -- 100° C. - 200° C. --.

Column 12,
Line 33, "130° C. 9'00"" (first occurrence) should be -- 130° C. 6'00" --.

Column 18,
Line 37, after "to" insert -- claim 35 --.

Signed and Sealed this

Twenty-first Day of June, 2005

JON W. DUDAS
*Director of the United States Patent and Trademark Office*